United States Patent [19]

Heins

[11] 3,728,620
[45] Apr. 17, 1973

[54] TRANSMISSION LINE FAULT INDICATOR AND LOCATOR UTILIZING VARIABLE FREQUENCY SOURCE COUPLED TO ONE END OF LINE

[76] Inventor: John L. Heins, 82 Harbor Lane, Massapequa Park, N.Y.

[22] Filed: July 14, 1971

[21] Appl. No.: 162,488

Related U.S. Application Data

[63] Continuation-in-part of Ser. No. 878,779, Nov. 21, 1969, abandoned.

[52] U.S. Cl. ...................................................324/52
[51] Int. Cl. ...........................................G01r 31/08
[58] Field of Search.......................324/51, 52, 54, 58, 324/58.5

[56] References Cited

UNITED STATES PATENTS

| | | | |
|---|---|---|---|
| 3,510,762 | 5/1970 | Leslie | 324/52 |
| 2,783,434 | 2/1957 | Babler | 324/52 |
| 3,131,347 | 4/1964 | Brooks et al. | 324/51 |
| 2,324,215 | 7/1943 | Kinsburg | 324/52 X |
| 2,499,001 | 2/1950 | Green | 324/52 |
| 3,403,335 | 9/1968 | Couper et al. | 324/58 |

OTHER PUBLICATIONS

Stringfield et al., Fault Location Methods for Overhead Lines AIEE Transactions, Aug. 1957, pp. 518–530 [p. 522 relied on].

*Primary Examiner*—Gerard R. Strecker
*Attorney*—Sandoe, Hopgood and Calimafde

[57] ABSTRACT

A system is disclosed which locates open and short-circuit faults on a transmission line by sensing a minimum occuring at the input end of the line. The apparatus comprises a variable frequency test signal source coupled to the input of an amplifier the output of which is adapted for connection to the input end of the transmission line. The frequency of the test signal is varied until a minimum is sensed at the output of the amplifier indicating the presence of a fault on the line. The location of the fault, that is, the distance from the input end of the line to the fault, is determined by the frequency of the source signal at which the minimum is produced. Means are provided in the system for resolving the ambiguity between an open-circuit fault and a short-circuit fault.

7 Claims, 4 Drawing Figures

PATENTED APR 17 1973  3,728,620

TRANSMISSION LINE FAULT INDICATOR AND LOCATOR UTILIZING VARIABLE FREQUENCY SOURCE COUPLED TO ONE END OF LINE

This is a continuation-in-part of application Ser. No. 878,779, filed on Nov. 21, 1969 now abandoned.

The present invention relates generally to fault locating and detecting systems, and particularly to a system for detecting and locating the presence of open and short circuits on a transmission line, or the like.

R.F. transmission lines, particularly of the coaxial type, are commonly used to couple high frequency signals from one point in a system to another. In a given application, such as in an airborne communication or radar system, CATV closed circuit television system, or the like, there may be hundreds of yards of such transmission lines, such as coaxial cables, formed from a plurality of interconnected lengths of such cable.

The connection between cable lengths is commonly achieved by the use of coaxial connectors connected to the ends of adjacent cable sections. It has been found that these connectors are frequently sources of failure in the transmission line as a result of short circuits or open circuits occurring therein. The latter fault may occur, for example, when the connection between the adjoining cables becomes broken or loosened. There is also the possibility of a failure or fault in the cable length itself due to, for example, a breakdown in the insulation between the central and outer conductors, although this is less likely than connector failure.

When a failure or defect of this type occurs, it is often imperative that it be promptly located and corrected. If not corrected, the system in which the transmission line is incorporated often becomes completely inoperative, and in certain situations, such as in a radar or airborne communications systems, any failure in the line may have serious consequences.

Heretofore, the location and detection of transmission line faults has been a difficult and time-consuming operation, requiring the use and interpretation of calibration charts, or the calculation of indicated data. Many of the systems in which such lines are used, such as in an airplane, are housed in cramped or confined quarters, in which the operation of bulky test equipment is difficult or even impossible.

It is thus an object of the present invention to provide a transmission line fault detector and locator which may be readily employed in confined areas.

It is another object of the present invention to provide a transmission line detector of the type described in which a direct and accurate indication of the location of the fault is obtained.

It is a further object of the present invention to provide a transmission line fault indicator in which the nature of the fault (i.e. open or short circuit) can be readily ascertained.

It is yet another object of the present invention to provide a transmission line fault indicator of the type described which is portable, and which may be operated and interpreted by technical personnel having a minimum amount of skill and training.

It is yet a further object of the present invention to provide a transmission line fault indicator and locator which can be readily used to test transmission lines of differing transmission characteristics.

The transmission line fault indicator and detector of the present invention makes use of the phenomena that a one-quarter wave open circuit transmission line presents a low impedance at the sending end of the line, and a one-half wave transmission line presents at the sending end of the line, the impedance "seen" at the receiving end of the line.

Thus, when a short circuit is present along the transmission line, a short circuit is seen at the sending end of the line, and the transmission line will constitute a line one-half wave length long at the location of the short circuit. Similarly, an open circuit along the line creates a one-quarter wave length line.

The system of the present invention provides means for correlating the frequency of a test signal applied to the line and the location of the fault from the known relation between frequency and wave length. Means are provided to resolve the ambiguity between one-quarter wave and one-half wave operation on the line, thereby to indicate the nature of the fault, to wit, open-circuit or short-circuit.

The system comprises a source of a test signal in the form of a variable frequency oscillator for connection to an input of an amplifier the output of which is in turn connected to the input or sending end of the transmission line. Means are provided to vary the frequency of the test signal and to detect the occurrence of a minimum at the amplifier output. When that minimum is detected, an indication is thereby given of the existence of a fault on the line. The fault is thus located either at one-half or one-quarter wave of the test frequency signal from the input of the line depending on the nature of the fault. Means coupled to the frequency varying element of the variable frequency oscillator provides a direct visual reading of the location of the fault in units of length along the line corresponding to the frequency of the test signal at which the minimum is detected, in terms of both quarter and half wave lengths. Means are provided to resolve the half-wave and quarter-wave ambiguity, thereby to provide a simple and readily comprehended indication of the fault location. As herein described the ambiguity of fault location is resolved by temporarily removing the line from the test signal source, connecting a d.c. source to the line, and thereafter measuring the signal at the input end of the line.

To enable the system of the present invention to be utilized with different types of transmission lines, that is, lines having different transmissive propagation characteristics so that the relation between frequency and wave length is different, the system of the present invention comprises means for varying in a predetermined manner the fault location indicator in accordance with the propagation characteristic of the line under test. The components of the system of the present invention may all be contained in a relatively compact and lightweight package to thereby provide portability and ease of operation.

To the accomplishment of the above and to such further objects as may hereinafter appear, the present invention relates to a R.F. transmission line fault indicator and locator as defined in the appended claims and as described in the following specification, taken in conjunction with the accompanying drawing in which:

Figure 2:
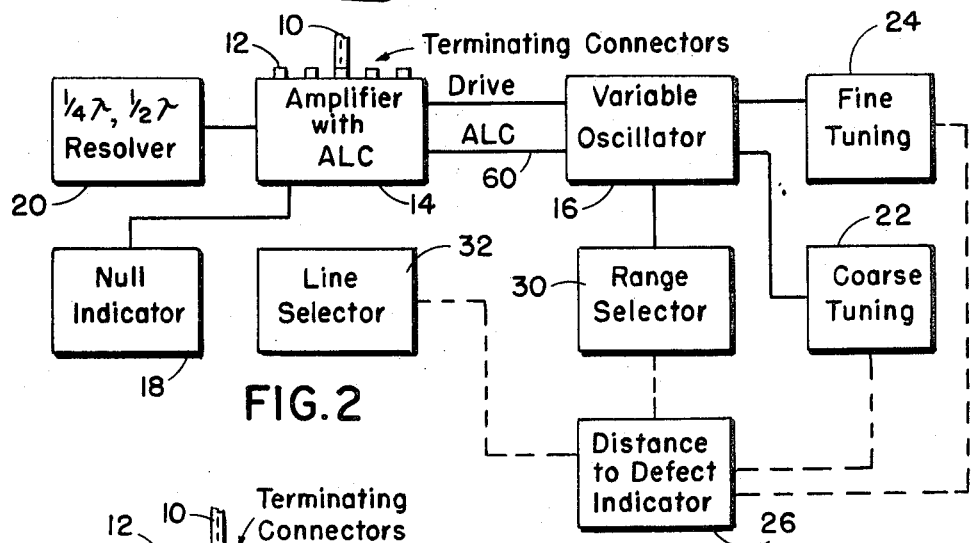
FIG. 2 is a schematic diagram in block form of the fault detector of FIG. 1.

Referring first to FIG. 2 there is shown, in block diagram form, a transmission line fault locator and detector which is used to great advantage when a precise location of a fault on a transmission line is required. The coaxial cable or line under test, indicated schematically at 10, has its input end connected to one of several coaxial test connectors 12 provided at the output terminal of an amplifier 14. Each of the output terminal connectors 12 is specially adapted for connection to one of the several well-known types of transmission lines.

Figure 4:
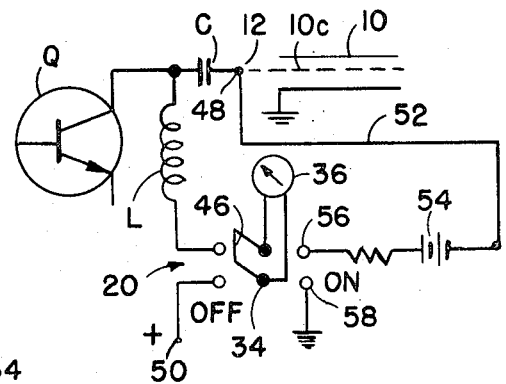
FIG. 4 is a schematic circuit diagram of the ambiguity resolver of the systems of FIGS. 2 and 3.

Amplifier 14 has an input receiving the output of a variable frequency oscillator 16, and a null indicator 18 is connected in the output circuit of amplifier 14. The distributed inductance-capacitance parameters of line 10 act, as shown in FIG. 4, as a tank or resonant circuit for the amplifier when a fault is present on the line. That is, when there is a short-circuit on line 10 the line establishes a series resonant circuit at the output of amplifier 14; when the fault is in the form of an open-circuit, the line establishes a parallel resonant circuit at the amplifier output. The frequency of oscillator 16 is varied until a minimum or null reading is obtained on indicator 18. That null, or minimum, which occurs when the output of oscillator 16 is at the resonant frequency of the amplifier resonant circuit established by the fault on the line, indicates the presence of either an open circuit located at one-quarter wave length along the line, or a short-circuit located at one-half wave length along the line. As the wave-length of the signal on the line is an inverse function of the frequency of the input signal, the location of the fault can thus be directly related to the frequency of the input or test signal applied to the line.

Since the fault may be located at either a one-half, or one-quarter wave length along the line, depending on whether the fault on the line is a short or an open-circuit, an ambiguity resolver 20 is connected in the output circuit of amplifier 14 to determine the nature of the fault, and to indicate the proper choice of a scale (associated with the frequency selector in a manner more completely described below) on which the distance to the fault is to be read.

In the system of FIG. 2, the frequency of oscillator 16 may be varied in two stages; to wit, by a coarse tuning control 22 to initially establish the approximate frequency at which a null is detected due to the presence of a fault, and a fine tuning control 24 to more precisely adjust the frequency of oscillator 16, thereby to more precisely obtain a null indication at indicator 18, and to more accurately locate the distance of the fault from the input end of the line.

A distance-to-fault indicator or scale 26 is operatively mechanically connected to the coarse and fine tuning controls 22 and 24 and is calibrated in units of distance such as feet or meters. Scale 26 provides a visual indication in units of distance in direct correspondence to the oscillator test signal frequency. To increase the operating range of the fault indicator of the invention, the frequency of oscillator 16 may be varied in increments by the operation of a range selector 30 connected to the tuning circuit of oscillator 16. Range selector 30 is also mechanically connected to the coarse distance indicator 26 to incrementally vary its initial setting. Indicator 26 may have several scales corresponding respectively to the setting of range selector 30.

As a result of the mechanical connection between tuning controls 22 and 24, and range selector 30 and indicator 26, the distance-to-fault reading of the latter corresponds directly to the frequency of the output test signal of oscillator 16. As is well known, wave length $\lambda$ is related to frequency $f$ by the expression $f = \lambda c$ where $c$ is the velocity of propagation of an electromagnetic wave along the medium. In free space, $c$ would be the speed of light. Since different types of transmission lines exhibit different velocities of propagation of electromagnetic energy therealong, the wave length-to-frequency ratio is different for each type of line. For this reason, in the present system a line selector 32 is mechanically connected to the distance indicator 26. Line selector 32 is positioned in accord with the transmissive nature of the line under test to initially vary the position of indicator 26 in accord with the known propagation characteristics of that line.

Figure 1:
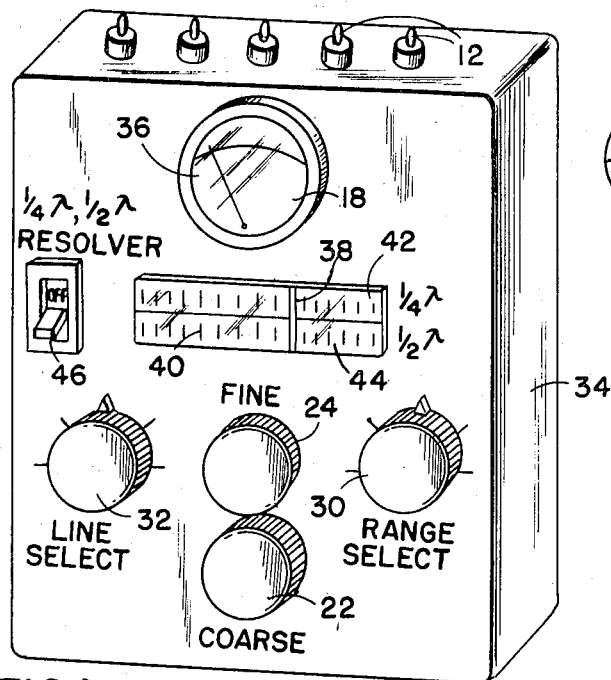
FIG. 1 is a perspective view of a transmission line fault detector according to the invention.

The fault detection and location system of FIG. 2 may be advantageously contained in a relatively small and lightweight housing 34 as illustrated in FIG. 1. As shown, the null detector 18 may be in the form of an ammeter 36. The coarse and fine tuning controls 22 and 24 are mechanically connected to a single pointer 39 such as through a slip clutch connection, which moves transversely across a distance-to-fault dial 40 which defines the indicator 26. Dial 40 is divided into two section; an upper section 42 for reading the fault location for an open circuit (one-quarter wave length) condition, and a lower section 44 for reading the fault location for a short circuit (one-half wave length) condition, both in terms of the position of pointer 38 along the dial. This is simply achieved by setting the distance reading of the one-quarter wave length section 42 to be twice that of the corresponding position on the lower, one-half wave length section 44.

The ambiguity resolver circuit 20, shown in FIG. 4, is controlled by the simple operation of a switch 46 arranged on the front panel of housing 34 in combination with the meter 36. In FIG. 4 the transistor Q, the inductor L and the capacitor C schematically represent the output circuit of amplifier 14. The central conductor 10c of the transmission line under test 10 is connected to one of the output connectors 12 at amplifier output node 48, the outer conductor of the line being grounded as is conventional. Node 48 is also connected to ambiguity resolver circuit 20 by a line 52 which includes a d.c. source 54 in series connection with a resistor R and a normally open contact 56.

Switch 46, when in the "off" position connects the collector of transistor Q to the B+ supply indicated at 50. To resolve wave-length ambiguity, switch 46 is moved to its "on" position which disconnects the collector of transistor Q from supply 50 and connects contact 56 to contact 58 and thus to ground. In the latter position, the meter 36 is in series with the d.c. source 54, resistor R, and the central conductor 10c of the line under test. If the fault on the line is a short-circuit, there will be a noticeable reading on meter 36 indicating to the operating technician that he is to read the distance measurement on the lower section 42 of distance dial 40 when switch 46 is returned to the "off" position, and the frequency of the test signal is varied until a null is detected on meter 36. On the other hand, if the fault on the line is an open circuit, there will be no reading on meter 36 and the distance-to-fault reading is to be made on the upper section 44 of dial 40.

The operation of the transmission fault detector and locator of the invention is thus exceedingly simple and convenient. The line 10 is connected to the system by means of the proper termination connector 12 on housing 34. In the event the line under test 10 terminates in a multiple plug, an adapter transmission line may be provided to extend the line. Suitable adjustment is then made to indicator 26 to take the length of this adaptor into consideration. Line selector 32 is set to its proper position corresponding to the transmissive nature of the line under test and resolver switch 46 is placed in its on position and null meter 36 is observed to indicate the nature of the fault line; whereupon switch 46 is returned to the off position. Range selector 30 is set to the proper range if any information of the distance to a suspected fault location is available. If no such information is available, the range selector is set either to a maximum or minimum reading. The frequency of the test signal is varied, first by the operation of coarse tuning control 22 until a null is sensed at meter 36, and the fine tuning control 24 is then varied for a more accurate null reading which also provides a more precise reading on detector 26. A direct reading may thereupon be made on the appropriate section of dial 40 which thus provides an accurate reading of the location of the fault on the line in terms of the distance of the fault from the input end of the line.

To increase the sensitivity of the null reading provided by meter 36, the output of amplifier 14 may be maintained at a preset level to provide full deflection of the meter at all times other than a null indication. This automatic level control is indicated by an ALC line 60 connected between amplifier 14 and oscillator 16, and serves to vary the effective gain of the amplifier in response to variations in the output of the oscillator. As circuitry for achieving such automatic gain or level control is well known to those skilled in the art, no further description of this circuitry is herein provided.

Figure 3:
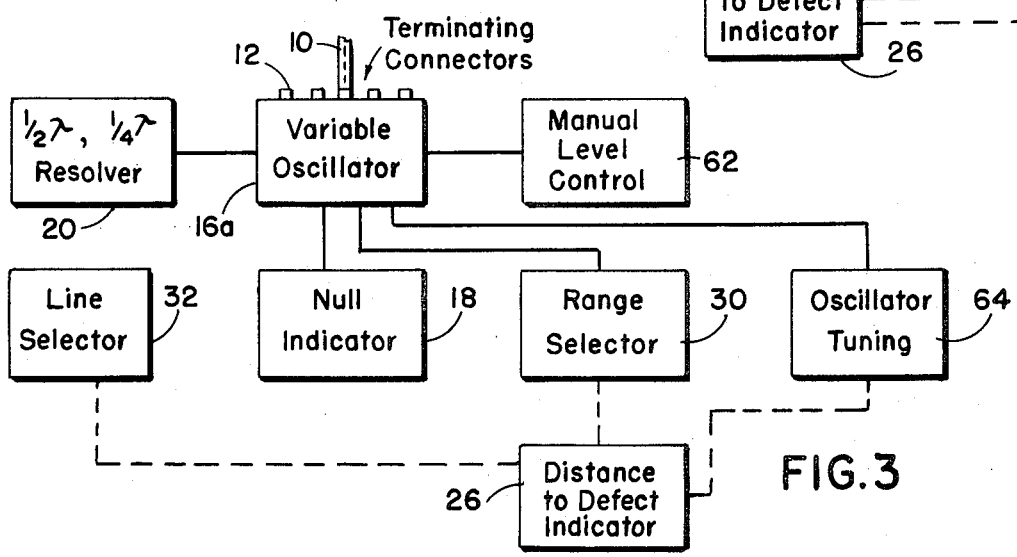
FIG. 3 is a schematic diagram in block form of a second embodiment of the transmission line fault detector of this invention.

The alternative fault detector system shown in block form in FIG. 3 is a simplified version of the system of FIG. 2 and can be utilized to advantage when great precision of fault-to-distance measurement is not required. The amplifier-oscillator combination in the earlier described embodiment is replaced by a variable frequency oscillator 16a, and in place of the automatic gain control provided in the FIG. 2 embodiment, the embodiment of FIG. 3 includes a manual level control 62 connected to the oscillator 16a to adjust the output amplitude of the oscillator whenever desired.

The other significant difference between the embodiments of FIGS. 2 and 3 is the use in the latter of only a single tuning control 64 to vary the frequency of the test signal and to position the pointer of the distance indicator 26 to a position corresponding to that frequency. In other major respects the design and manner of operation of the two described embodiments of the present invention are substantially similar.

As will be appreciated from the above, the transmission line fault detector and location indicator of the invention permits the quick and accurate indication of the location of a fault at any location on the line. The system is characterized by its portability and ease of employment by even relatively unskilled personnel. The former feature permits the use of the fault indicator in confined locations otherwise inaccessible to the known systems of this type. Moreover, the location of the fault is expressed in a single reading in units of distance, which may be quickly and simply interpreted without the need for additional charts, graphs or the like.

While the system has been specifically described herein as employing a meter as a null detector, other devices such as a cathode ray tube may be employed to equal advantage. Thus while only several embodiments of the invention are here specifically described, it will be apparent that modifications may be made therein, without departing from the spirit and scope of the invention.

I claim:

1. A device for locating a fault condition on a transmission line or the like comprising an amplifier having an output adapted for connection to one end of a transmission line under test, a variable frequency signal source coupled to the input of said amplifier, the transmission line when a fault is present thereon constituting a resonant circuit coupled to the output of said amplifier, means operatively connected to said signal source for varying the frequency of said signal, means operatively connected to the output of said amplifier for sensing at said one end a minimum signal in response to the occurrence of resonance of said resonant circuit at the frequency of said test signal, and means coupled to and responsive to said frequency-varying means for indicating the location of the fault with respect to the distance of the fault from said one end of the line corresponding to the frequency of said signal source at which said minimum signal is obtained.

2. The system of claim 1, in which said sening means comprises means for detecting an effective null resulting from the presence of either an operative short-circuit or an operative open circuit fault on the line, and further comprising means for determining which of said faults is present on the line.

3. The system of claim 2, in which said determining means comprises means for selectively applying a d.c. signal to said line, and means for measuring the current flow through the line upon the application of said d.c. signal thereto.

4. The system of claim 3, in which said null detecting means defines said current-measuring means, said d.c. signal-applying means comprising switch means effective when said d.c. signal is applied to said line to disconnect said null indicating means from operative connection with said signal source.

5. The system of claim 4, further comprising line select means operatively connected to said indicating means for varying the latter in accord with the transmissive nature of the line under test.

6. The system of claim 1, further comprising line select means operatively connected to said indicating means for varying the latter in accord with the transmissive nature of the line under test.

7. The system of claim 2, further comprising line select means operatively connected to said indicating means for varying the latter in accord with the transmissive nature of the line under test.

* * * * *